United States Patent
Kojima et al.

(10) Patent No.: US 9,699,726 B2
(45) Date of Patent: Jul. 4, 2017

(54) DATA-TRANSMITTING/RECEIVING METHOD FOR EFFECTIVELY SUPPRESSING POWER CONSUMPTION

(71) Applicant: NATIONAL INSTITUTE OF INFORMATION AND COMMUNICATIONS TECHNOLOGY, Koganei-shi, Tokyo (JP)

(72) Inventors: Fumihide Kojima, Yokosuka (JP); Hiroshi Harada, Kyoto (JP)

(73) Assignee: NATIONAL INSTITUTE OF INFORMATION AND COMMUNICATIONS TECHNOLOGY, Tokyo (JP)

(*) Notice: Subject to any disclaimer, the term of this patent is extended or adjusted under 35 U.S.C. 154(b) by 122 days.

(21) Appl. No.: 14/416,240

(22) PCT Filed: Sep. 21, 2012

(86) PCT No.: PCT/JP2012/006002
§ 371 (c)(1),
(2) Date: Jan. 21, 2015

(87) PCT Pub. No.: WO2014/016878
PCT Pub. Date: Jan. 30, 2014

(65) Prior Publication Data
US 2015/0208348 A1    Jul. 23, 2015

(30) Foreign Application Priority Data
Jul. 23, 2012  (JP) ................. 2012-162410

(51) Int. Cl.
H04W 52/02  (2009.01)
H04W 56/00  (2009.01)
(Continued)

(52) U.S. Cl.
CPC ....... *H04W 52/0212* (2013.01); *H04L 5/0044* (2013.01); *H04W 56/00* (2013.01);
(Continued)

(58) Field of Classification Search
CPC ......... H04W 52/0212; H04W 56/0015; H04W 76/023; H04L 5/0044
See application file for complete search history.

(56) References Cited

U.S. PATENT DOCUMENTS 5,513,182 A    4/1996 Kawamura et al.
8,379,539 B2   2/2013 Bange et al.
(Continued)

FOREIGN PATENT DOCUMENTS

JP    06232890 A    8/1994
WO   2008090920 A1  7/2008
(Continued)

OTHER PUBLICATIONS

Related U.S. Appl. No. 14/416,238, filed Jan. 21, 2015, First Named Inventor: Fumihide Kojima, Title: Data Transmitting/Receiving Method.
(Continued)

*Primary Examiner* — Jackie Zuniga Abad
(74) *Attorney, Agent, or Firm* — Holtz, Holtz & Volek PC

(57) ABSTRACT

A data transmitting/receiving method capable of effectively suppressing power consumption includes: establishing synchronization between a master device and a slave device; receiving a data frame; extracting payloads from the received data frame; generating a new payload section by combining the extracted payloads with another payload extracted from another data frame received from another device or a new payload generated by the device; generating a new synchronization section and a new header section; generating a new data frame by combining the new syn-
(Continued)

chronization section and the new header section that are generated with the new payload section; and transmitting the generated new data frame.

8 Claims, 12 Drawing Sheets

(51) Int. Cl.
  *H04L 5/00* (2006.01)
  *H04W 76/02* (2009.01)
  *H04W 84/20* (2009.01)
  *H04W 28/06* (2009.01)
(52) U.S. Cl.
  CPC ..... *H04W 56/0015* (2013.01); *H04W 76/023* (2013.01); *H04W 28/065* (2013.01); *H04W 84/20* (2013.01); *Y02B 60/50* (2013.01)

(56) References Cited

U.S. PATENT DOCUMENTS

| | | |
|---|---|---|
| 8,379,664 B2 | 2/2013 | Cordeiro et al. |
| 8,472,426 B2 | 6/2013 | Choi et al. |
| 8,653,935 B2 | 2/2014 | Baker |
| 2009/0122755 A1 | 5/2009 | Seok et al. |
| 2009/0238160 A1 | 9/2009 | Bhatti et al. |
| 2010/0254404 A1* | 10/2010 | Cordeiro ............. H04W 76/023 370/461 |
| 2010/0278124 A1 | 11/2010 | Huang et al. |
| 2012/0106397 A1 | 5/2012 | Abedi |
| 2013/0124763 A1* | 5/2013 | Kessler ............... G06F 13/4295 710/110 |
| 2013/0279372 A1* | 10/2013 | Jain ........................ H04W 4/06 370/254 |

FOREIGN PATENT DOCUMENTS

| | | |
|---|---|---|
| WO | 2009061110 A1 | 5/2009 |
| WO | 2010100443 A1 | 9/2010 |

OTHER PUBLICATIONS

International Search Report (ISR) dated Dec. 25, 2012 issued in International Application No. PCT/JP2012/006002.

* cited by examiner

DATA-TRANSMITTING/RECEIVING METHOD FOR EFFECTIVELY SUPPRESSING POWER CONSUMPTION

TECHNICAL FIELD

The present invention relates to a data transmitting/receiving method capable of effectively suppressing power consumption.

BACKGROUND ART

A wireless personal area network is a local area network that enables devices under a work environment of a person and devices present on the periphery thereof to be mutually interconnected.

Recently, in such a wireless personal area network, communication devices, which are compliant with the specification of IEEE 802.15.4, that are small-sized and low-priced and are capable of performing low-output digital radio communication have been used.

A network that is compliant with the specification of IEEE 802.15.4 is configured by two types of devices including an FFD (Full Function Device) and an RFD (Reduced Function Device) when the devices are broadly classified.

The FFD is a full-function built-in device having a function for approving the participation of a new device to participate in a personal area network (PAN) to which the FFD belongs and a function for defining a superframe used in communication with the other devices. Among such FFDs, a device that is present solely in each network and further has a function for determining an ID of the whole network is called a PAN coordinator.

On the other hand, the RFD is a device that does not have the participation approval function and the superframe defining function described above, which are included in the FFD, and is a function-limited-type device that has the same functions as those of the FFD except for such functions.

FIGS. 11(A) and 11(B) are schematic diagrams that illustrate topologies of networks configured by FFDs and RFDs. As illustrated in FIGS. 11(A) and 11(B), as topologies of such a network, there are topologies of a star-type network (FIG. 11(A)), a peer-to-peer network (FIG. 11(B)), and the like.

The star-type network is configured by a PAN coordinator and a plurality of FFDs or RFDs. Among all the devices, master-slave relations are formed (see Patent Literature 1). By periodically transmitting a synchronization signal (beacon) from an FFD that is a master positioned at a higher level to the FDDs or RFDs that are slaves positioned at a lower level, synchronization between the master and each slave is established, and information is transmitted and received using a TDMA (Time Division Multiple Access) system.

On the other hand, the peer-to-peer network is similar to the star-type network described above in that the network is configured by a PAN coordinator and a plurality of FFDs or RFDs but has a difference from the star-type network in that all the devices are equal, in other words, the master-slave relation is not formed between devices. Between the devices configuring the peer-to-peer network, information is transmitted and received using a CSMA (Carrier Sense Multiple Access) system.

The star-type network of the two network topologies described above will now be described in more detail. FIG. 12 is a diagram that illustrates an information transmission/reception method in a conventional star-type network.

As illustrated in FIG. 12, in the conventional star-type network, synchronization is established between a master and a slave according to a beacon signal transmitted from the master device, and an interval (Beacon Interval, BI) between beacon signals is established as a TDMA period.

The TDMA period is configured by an active period during which a slave device is operated, and information is transmitted and received and an inactive period during which the slave device is in a sleep mode.

The active period is defined as a superframe duration (SD) and is configured by a contention access period (CAP) and a contention-free access period (CFP).

The CAP is a period during which information is permitted to be transmitted and received between a master device and all the slave device that perform communication.

On the other hand, the CFP is a period during which information is permitted to be transmitted and received to/from one slave device that is assigned by the master device. During the CFP, each slave device can transmit/receive information to/from the master device only within a GTS (Guaranteed Time Slot) that is allocated thereto.

Data frames are transmitted and received between devices only during the CAP or the CFP described above.

The inactive period is a period of the BI other than the active period described above, in other words, a time other than the SD. As described above, during the inactive period, the slave device is in the sleep mode. Accordingly, as the SD occupied in the BI increases, the inactive period is shortened as that much, and the slave device is not in the sleep mode but continues to be operated.

CITATION LIST

Patent Literature

Patent Literature 1: JP 06-232890 A

SUMMARY OF INVENTION

Technical Problem

However, in a conventional data transmitting/receiving method, in a case where data frames are sequentially relayed from a lower-level device to a higher-level device, data frames transmitted from each device are individually relayed. Accordingly, also in a case where a plurality of data frames is transmitted from a device to another device, although the transmission source and the transmission destination are the same, the same synchronization section and the same header section (hereinafter, referred to as redundant sections) are disposed in the data frames. As the redundant sections are redundant in such a way, it takes a long time for the transmission/reception of data frames, and the operating time of each device increases, whereby the power is wasted.

The present invention is devised in consideration of the above-described problems, and an object thereof is to provide a data transmitting/receiving method capable of suppressing the waste of power.

Solution to Problem

Inventors of the present invention, in order to solve the above-described problems, have invented a data transmitting/receiving method capable of effectively suppressing the waste of power.

A data transmitting/receiving method according to claim 1 is a data transmitting/receiving method that is performed between a master device and at least one slave device, a data frame transmitted/received between the master device and the slave device being configured to include a synchronization section that defines a signal used for the synchronization, a payload section that includes at least one payload and a combined information header defining the number of the payloads and a pay load length of each of the payloads, and a header section that defines a pay load length of the whole payload section, the data transmitting/receiving method including: synchronization establishing step for establishing synchronization between the master device and the slave device based on predetermined synchronization information; receiving step for receiving the data frame after the establishment of the synchronization; payload extracting step for extracting the payloads from the received data frame; payload generating step for generating a new payload section by combining the extracted payloads with another payload extracted from another data frame received from another device or a new payload generated by the device; header generating step for generating a new synchronization section and a new header section; data frame generating step for generating a new data frame by combining the new synchronization section and the new header section with the new payload section; and transmitting step for transmitting the generated new data frame.

In addition, a data transmitting/receiving method according to claim 2 is characterized in that, in the data transmitting/receiving method according to claim 1, in the synchronization establishing step, the device that receives the data frame periodically repeats standby for a short time, and the device that transmits the data frame continuously transmits a first synchronization signal representing transmission timing of the data frame as the predetermined synchronization information before the transmission of the data frame.

In addition, a data transmitting/receiving method according to claim 3 is characterized in that, in the data transmitting/receiving method according to claim 1, in the synchronization establishing step, all the devices periodically transmit a second synchronization signal representing reception timing of the data frame as the predetermined synchronization information, and the device transmitting the data frame receives the second synchronization signal from the device receiving the data frame.

In addition, a data transmitting/receiving method according to claim 4 is characterized in that, in the data transmitting/receiving method according to claim 1, in the synchronization establishing step, the predetermined synchronization information is a beacon signal transmitted from the master device, the data transmitting/receiving method further including frequency lowering step for lowering a transmission frequency of the beacon signal from the master device in a state in which the synchronization is maintained.

In addition, a data transmitting/receiving method according to claim 5 is characterized in that, in the data transmitting/receiving method according to any one of claims 1 to 4, the data transmitting/receiving method further includes: contention access period (CAP) setting step for setting a CAP during which the data frame is transmitted/received between the master device and the slave device based on the established synchronization; and extending step for extending the transmission/reception of the data frame even after the CAP in a case where the transmission/reception of the data frame is not completed within the CAP.

In addition, a data transmitting/receiving method according to claim 6 is the data transmitting/receiving method according to any one of claims 1 to 5, wherein the slave device determines the master device to be connected based on a predetermined criterion.

Advantageous Effects of Invention

According to the invention relating to claim 1, redundant sections such as a synchronization section and a header section can be reduced, and accordingly, a time required for the transmission/reception of data can be reduced. By reducing the time required for the transmission/reception of data, the operating time of each device can be shortened, whereby the power consumption can be suppressed.

According to the invention relating to claim 2, each device is periodically operated and stands by for a short time and can change to a sleep mode at a time other than the standby time, and accordingly, waste of the power is effectively suppressed, whereby power saving can be achieved. In addition, it is not necessary to periodically transmit a beacon signal unlike the conventional data transmitting/receiving method, and only a wakeup frame may be transmitted as is necessary, and accordingly, waste of the power is effectively suppressed, whereby further power saving can be achieved.

According to the invention relating to claim 3, since transmission/reception is started immediately after the transmission of a synchronization signal, there is no time loss until the start of transmission/reception. Thus, the active period is shortened, and an inactive period, in other words, a period during which the device is in the sleep mode can be increased. Accordingly, the operating time of the device can be shortened, whereby the power consumption of the device can be effectively suppressed.

According to the invention relating to claim 4, a beacon signal is transmitted from the master device only when synchronization between the master and the slave is established according to a beacon interval, and, after the synchronization is established, the transmission frequency of the beacon signal is lowered. Accordingly, the power consumption for transmission/reception of unnecessary beacon signals after the establishment of the synchronization can be effectively suppressed.

According to the invention relating to claim 5, the CAP can be shortened more than that of the conventional data transmitting/receiving method. Thus, the active period is shortened, and an inactive period, in other words, a period during which the device is in the sleep mode can be increased as that much, whereby power consumption of the device can be effectively suppressed.

According to the invention relating to claim 6, the priority level is determined based on a predetermined t criterion, and accordingly, a PAN can be built in a speedy manner.

BRIEF DESCRIPTION OF DRAWINGS

FIGS. 11(A) and 11(B) are diagrams that respectively illustrate a star topology and a peer-to-peer topology.

DESCRIPTION OF THE EMBODIMENTS

Figure 11:
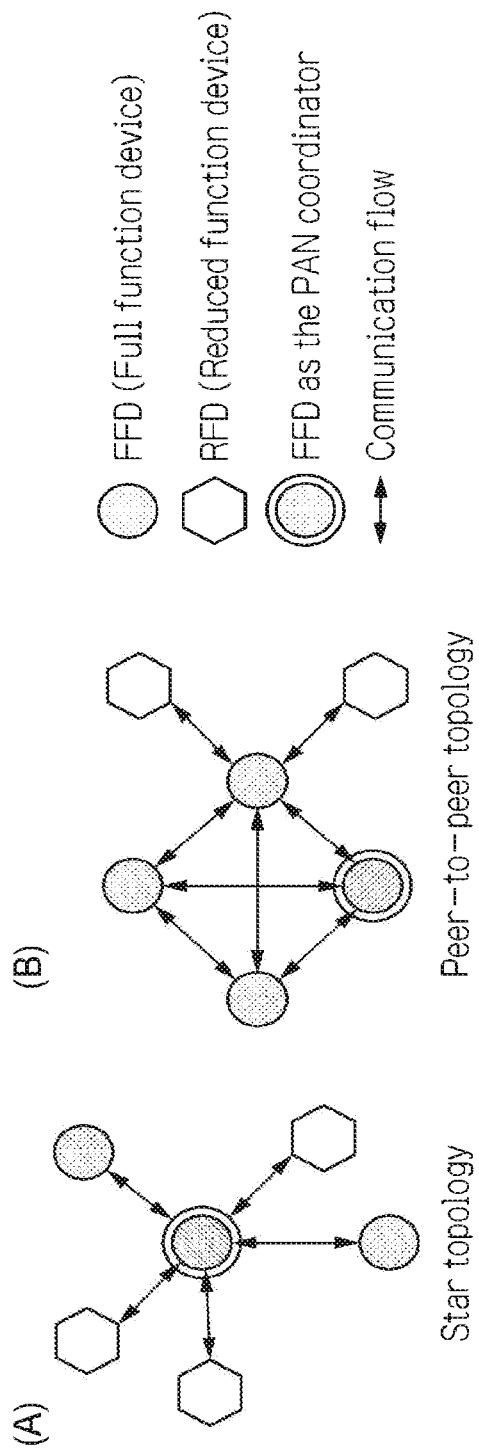
FIGS. 11(A) and 11(B) are schematic diagrams that illustrate topologies of networks configured by FFDs and RFDs.
Figure 12:
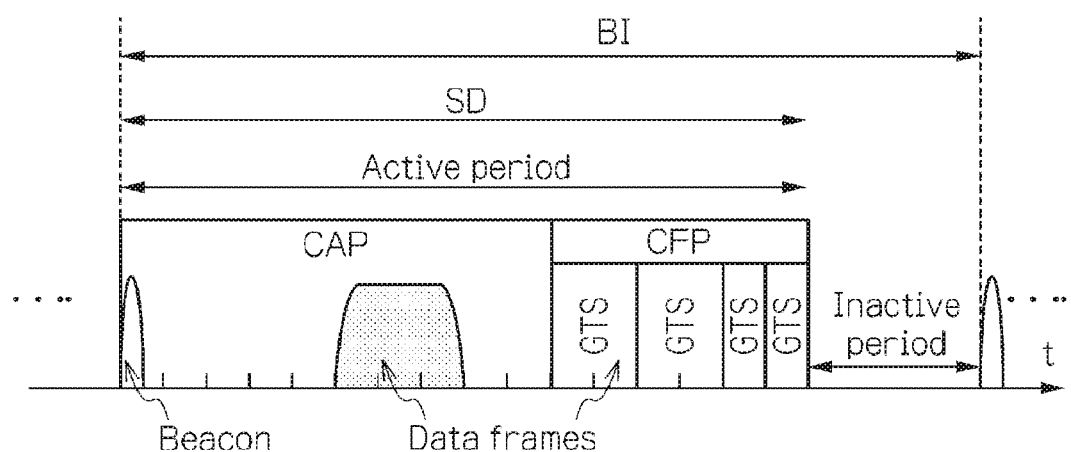
FIG. 12 is a diagram that illustrates an information transmitting/receiving method in a conventional star-type network.

Hereinafter, embodiments of the present invention will be described in detail. While an example is described in which a data transmitting/receiving method according to each embodiment described below is used for data transmission/reception in a star-type network illustrated in FIG. 11(A), the present invention is not limited thereto but may be applied a topology in which a master-slave relation is built between devices such as a tree-type network.

First Embodiment

Figure 1:
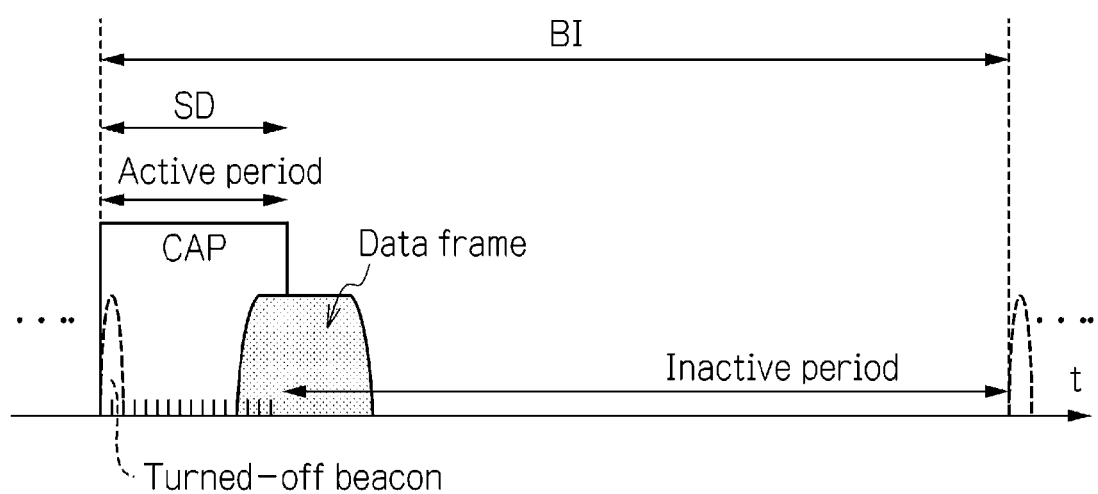
FIG. 1 is a diagram that illustrates a superframe used in a data transmitting/receiving method according to a first embodiment.

A data transmitting/receiving method according to a first embodiment of the present invention will be described. FIG. 1 is a diagram that illustrates a superframe used in the data transmitting/receiving method according to the first embodiment.

As illustrated in FIG. 1, in the data transmitting/receiving method according to this embodiment, an SD defining an active period is configured only by a CAP.

In the data transmitting/receiving method according to this embodiment, while transmission/reception of a data frame is started within the CAP, the transmission/reception does not need to be completed within the CAP. Thus, in a case where the transmission/reception of the data frame is not completed within the CAP, a device performing the transmission/reception of the data frame can continue the transmission/reception of the data even after the end of the CAP until the transmission/reception of the data is completed. In addition, a device that does not perform transmission/reception of data at the time when the CAP ends becomes in a sleep mode when the CAP ends.

For this reason, the CAP can be shortened more than that of a conventional data transmitting/receiving method, and an active period is shortened, and an inactive period, in other words, a period during which the device is in the sleep mode can be increased as that much. Accordingly, the operating time of the device can be shortened, whereby the power consumption of the device can be effectively suppressed.

In addition, in the data transmitting/receiving method according to this embodiment, after a beacon signal is transmitted from a master device at the time of establishing synchronization according to a beacon interval, and the synchronization is established, subsequently, the transmission frequency of the beacon signal is lowered. More specifically, after the establishment of the synchronization, the transmission frequency is lowered to a fraction of the beacon interval at the time of the establishment of the synchronization, or the transmission of the beacon signal is stopped, and the transmission is restarted as is necessary.

For this reason, power consumption according to the transmission/reception of unnecessary bean signals after the establishment of the synchronization can be effectively suppressed. In FIG. 1, the appearance of establishment of synchronization according to a first beacon signal is not illustrated.

Figure 2:
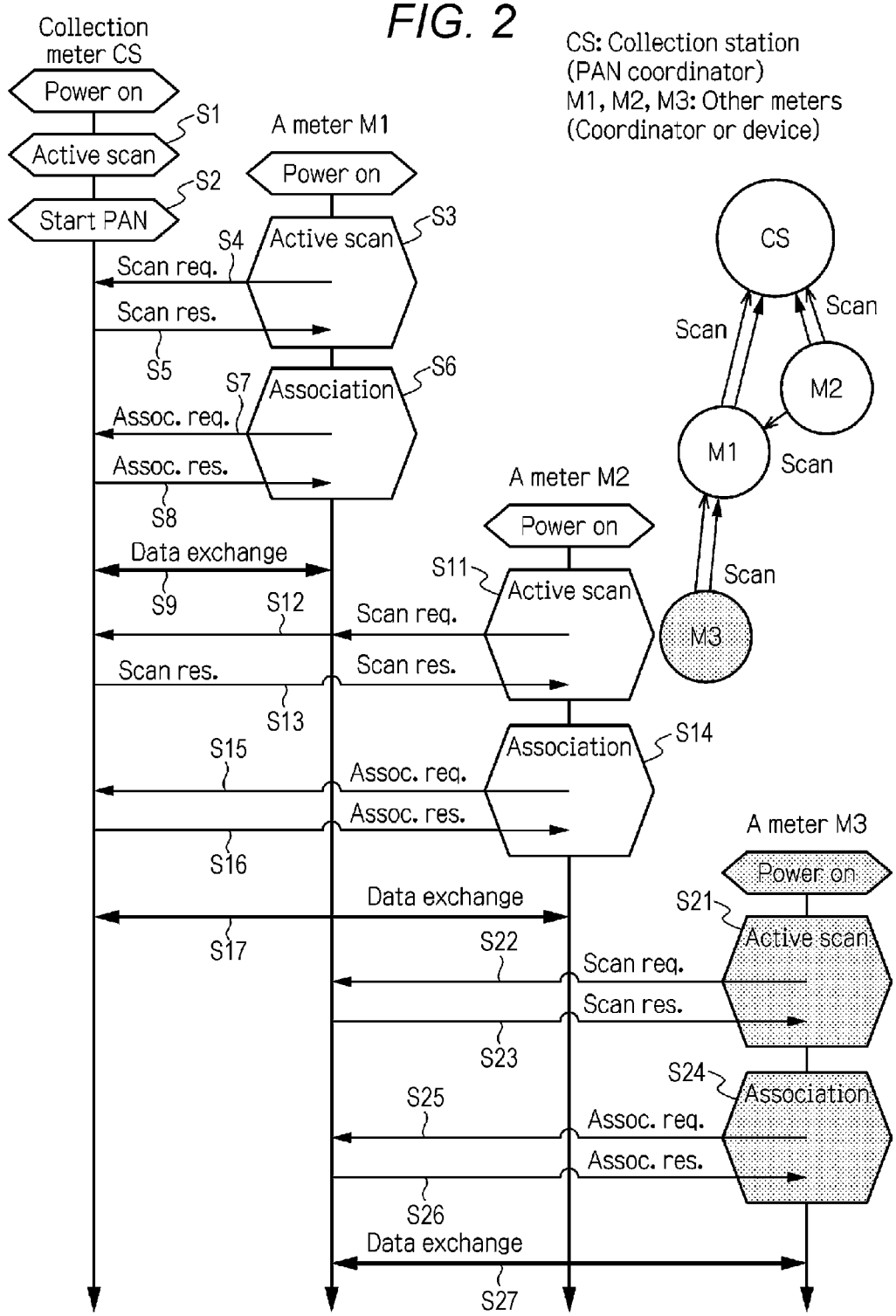
FIG. 2 is a sequence diagram that illustrates the appearance of building a network topology in the data transmitting/receiving method according to the first embodiment.

Next, building a network topology in the data transmitting/receiving method according to the first embodiment will be described. FIG. 2 is a sequence diagram that illustrates the appearance of building a network topology in the data transmitting/receiving method according to the first embodiment. As illustrated in FIG. 2, as an application example of the data transmitting/receiving method according to this embodiment, a metering network in which various kinds of information is collected in a collection meter CS (Collection Station) that is a SUN collection station serving as a PAN coordinator through a higher-level meter from a lower-level meter via a wireless network will be described as an example.

The wireless network illustrated in FIG. 2 is configured by four meters including the collection meter CS, a meter M1, a meter M2, and a meter M3. The collection meter CS is a master device of a highest level, the meters M1 and M2 serve as slave devices for the collection meter CS, and the meter M3 serves as a slave device for the meter M1. In this network, the building of a network topology is started as, first, the power of the collection meter CS is turned on, and the collection meter CS performs active scan (step S1).

Next, the collection meter CS defines a PANID and a superframe thereof and starts a PAN (step S2).

Next, the power of the meter M1 is turned on, and active scan using the meter M1 is performed (step S3).

In the active scan using the meter M1, first, the meter M1 broadcasts a scan request (step S4).

Then, the collection meter CS that is an FFD present within a reception range of the scan request broadcasted from the meter M1 unicasts a response (scan response) for the received scan request to the meter M1 (step S4). As the meter M1 receives this scan response, the meter M1 finds the collection meter CS and recognizes that the collection meter CS is a device having a possibility of being a master device therefor, and the active scan of the meter M1 ends.

Next, the meter M1 starts association with the PAN of the collection meter CS (step S6).

In the association of the meter M1, first, the meter M1 unicasts an association request to the collection meter CS that can be a master device (step S7).

Next, the collection meter CS that has received the association request from the meter M1 unicasts an association response to the meter M1 (step S8). As this association response is received by the meter M1, the association of the meter M1 with the PAN having the collection meter CS as a master device is completed.

By completing the association between the collection meter CS and the meter M1 in this way, data can be transmitted and received therebetween (step S9).

Next, the power of the meter M2 is turned on, and active scan using the meter M2 is performed (step S11).

In the active scan using the meter M2, first, the meter M2 broadcasts a scan request (step S12).

Then, when the scan request is received, the collection meter CS and the meter M1 that are FFDs present in the reception range of the scan request broadcasted from the meter M2 unicast scan responses to the meter M2 (step S13). As the meter M2 receives these scan responses, the meter M2 finds the collection meter CS and the meter M1 that can be master devices. In a case where there is a plurality of devices that can be master devices, the device recognizes a device having a high priority level for being the master device based on a predetermined criterion. In this embodiment, the meter M2 recognizes that the collection meter CS is a device having a higher priority level between the two meters that can be master devices based on a predetermined criterion. In this way, the active scan using the meter M2 ends.

This priority level is determined based on a predetermined criterion such as a distance up to the collection meter CS, a distance from a device that has transmitted a scan request, or order in which scan responses are transmitted. In this embodiment, the priority level is determined based on a distance up to the collection meter CS, and the collection meter CS is a device having a highest priority level. In this way, since the priority level is determined based on the predetermined criterion, a PAN can be built in a speedy manner.

Next, the meter M2 starts association of the collection meter CS with the PAN (step S14).

In the association of the meter M2, first, the meter M2 unicasts an association request to the collection meter CS that is a device having a higher priority level (step S15).

Next, the collection meter CS that has received the association request from the meter M2 unicasts an association response to the meter M2 (step S16). As this association response is received by the meter M2, the association of the meter M2 with the PAN having the collection meter CS as a master device is completed.

By completing the association between the collection meter CS and the meter M2 in this way, data can be transmitted and received therebetween (step S17).

Next, the power of the meter M3 is turned on, and active scan using the meter M3 is performed (step S21).

In the active scan using the meter M3, first, the meter M3 broadcasts a scan request (step S22).

Then, when the scan request is received, the meter M1 that is present within the reception range of the scan request broadcasted from the meter M3 unicasts a scan response to the meter M3 (step S23). As the meter M3 receives this scan response, the meter M3 finds the meter M1 that can be a master device, and the active scan using the meter M3 ends.

Next, the meter M3 starts association of the collection meter CS with the PAN (step S14).

In the association of the meter M3, first, the meter M3 unicasts an association request to the meter M1 that can be a master device (step S25).

Next, the meter M1 that has received the association request from the meter M3 unicasts an association response to the meter M3 (step S26). As this association response is received by the meter M3, the association of the meter M3 with the PAN having the meter M1 as a master device is completed.

By completing the association between the meter M1 and the meter M3 in this way, data can be transmitted and received therebetween (step S27).

Figure 3:
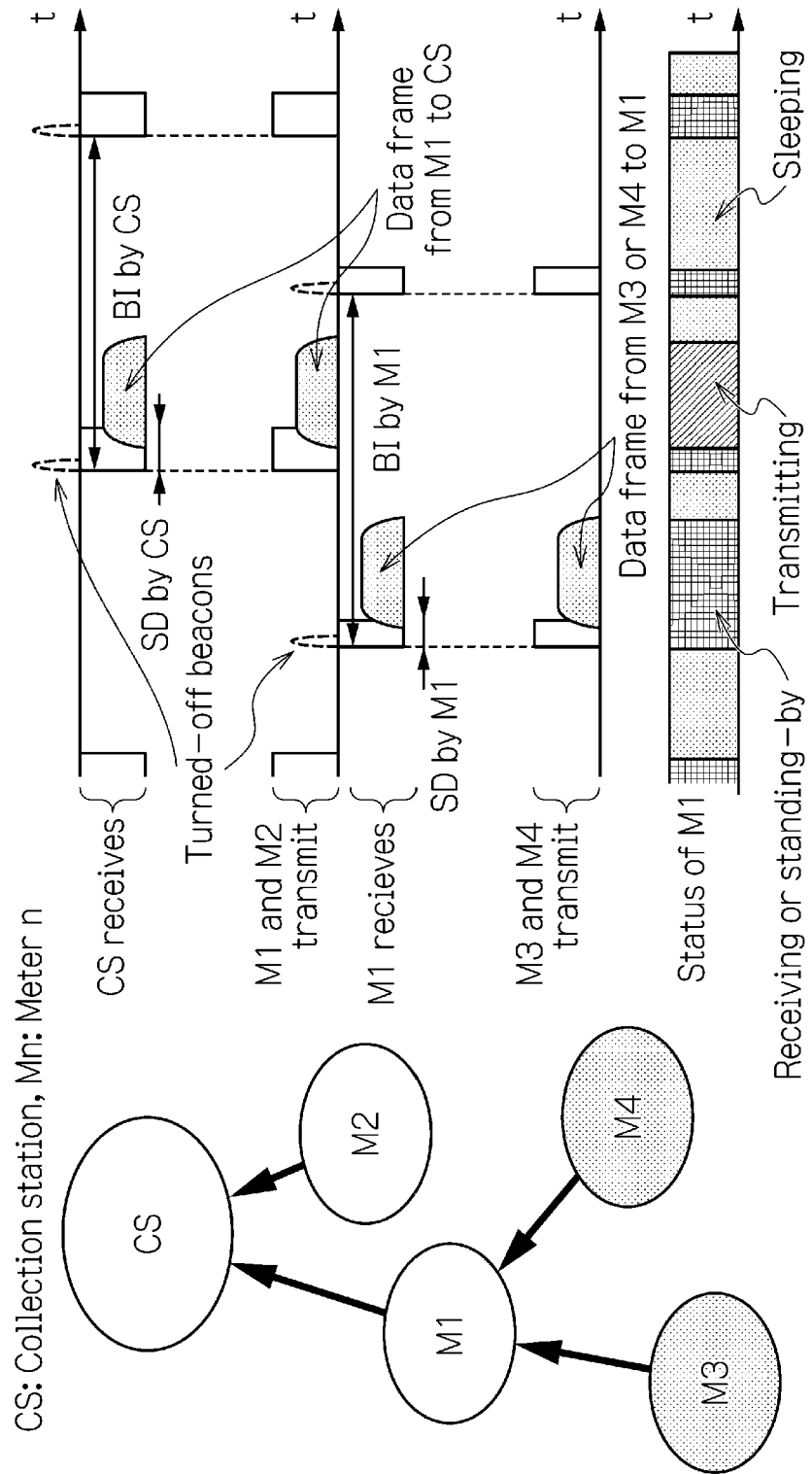
FIG. 3 is a diagram that illustrates the appearance of a data relay in the data transmitting/receiving method according to the first embodiment.

Next, an example of a data relay in the data transmitting/receiving method according to this embodiment will be described. FIG. 3 is a diagram that illustrates the appearance of a data relay in the data transmitting/receiving method according to this embodiment.

As illustrated in FIG. 3, in the data transmitting/receiving method according to this embodiment, transmission/reception of data between the collection meter CS as a master device and the meter M1 or M2 as a slave device therefor is performed according to a superframe determined by the collection meter CS. In addition, transmission/reception of data between the meter M1 as a master device and the meter M3 or M4 as a slave device therefore is performed according to a superframe determined by the meter M1.

In the transmission/reception of data between the collection meter CS and the meter M1 or M2 and the transmission/reception of data between the meter M1 and the meter M3 or M4 as a slave device described above, as described with reference to FIG. 1, the SD that defines an active period is configured by only the CAP. In the data transmitting/receiving method according to this embodiment, while transmission/reception of a data frame is started within the CAP, the transmission/reception does not need to be completed within the CAP. Thus, in a case where the transmission/reception of the data frame is not completed within the CAP, the transmission/reception of the data is continued even after the end of the CAP until the transmission/reception of the data is completed.

In this way, in the data transmitting/receiving method according to this embodiment, since the CAP can be shortened more than that of the conventional data transmitting/receiving method, the active period is shortened, and the inactive period, in other words, a period during which the device is in the sleep mode can be increased as that much. Accordingly, the power consumption of the device can be effectively suppressed.

In addition, in the data transmitting/receiving method according to this embodiment, a beacon signal is transmitted from the master device only when synchronization between the master and the slave according to a beacon interval is established, and, after the establishment of the synchronization, the transmission of the beacon signal is stopped.

For this reason, the power consumption according to the transmission/reception of unnecessary beacon signals after the establishment of synchronization can be effectively suppressed. In addition, the transmission of beacon signals may be configured to be restarted as is necessary in a case where the synchronization cannot be maintained or the like.

Second Embodiment

Next, a data transmitting/receiving method according to a second embodiment of the present invention will be described.

Figure 4:
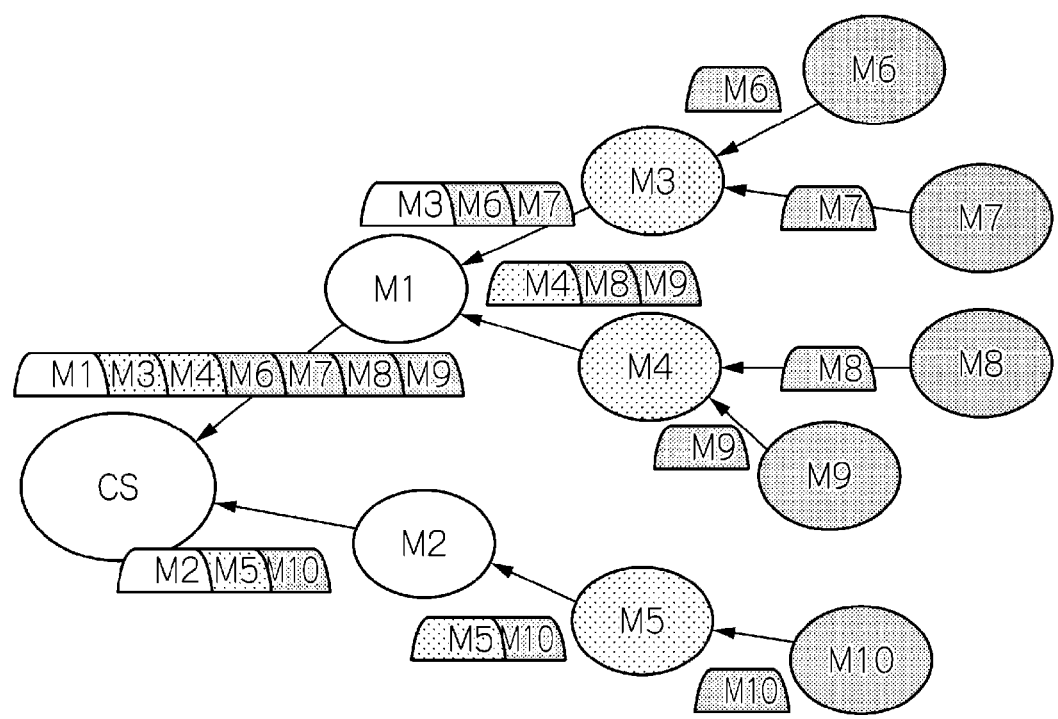
FIG. 4 is a diagram that illustrates a data transmitting/receiving method according to a second embodiment.

FIG. 4 is a diagram that illustrates the data transmitting/receiving method according to the second embodiment. As illustrated in FIG. 4, similar to FIG. 2, a metering network in which various kinds of information is collected in a collection meter CS serving as a PAN coordinator through a higher-level meter from a lower-level meter through a wireless network will be described as an example.

The wireless network illustrated in FIG. 4 is configured by eleven meters including the collection meter CS and meters M1 to M10. In the data transmitting/receiving method according to this embodiment, every time data is sequentially relayed and collected from a lowest-level meter toward the collection meter CS according to the data transmitting/ receiving method of the first embodiment described above, a synchronization section and a header section are newly generated, and a payload supplied from each meter is combined with such data.

Accordingly, redundant sections such as a synchronization section and a header section can be reduced, and accordingly, a time required for the transmission/reception of data can be reduced. Then, by reducing the time required for the transmission/reception of data, the device transmitting/receiving data after the end of the CAP according to the first embodiment also can change to the sleep mode in a speedier manner, whereby the power consumption can be suppressed.

Figure 5:
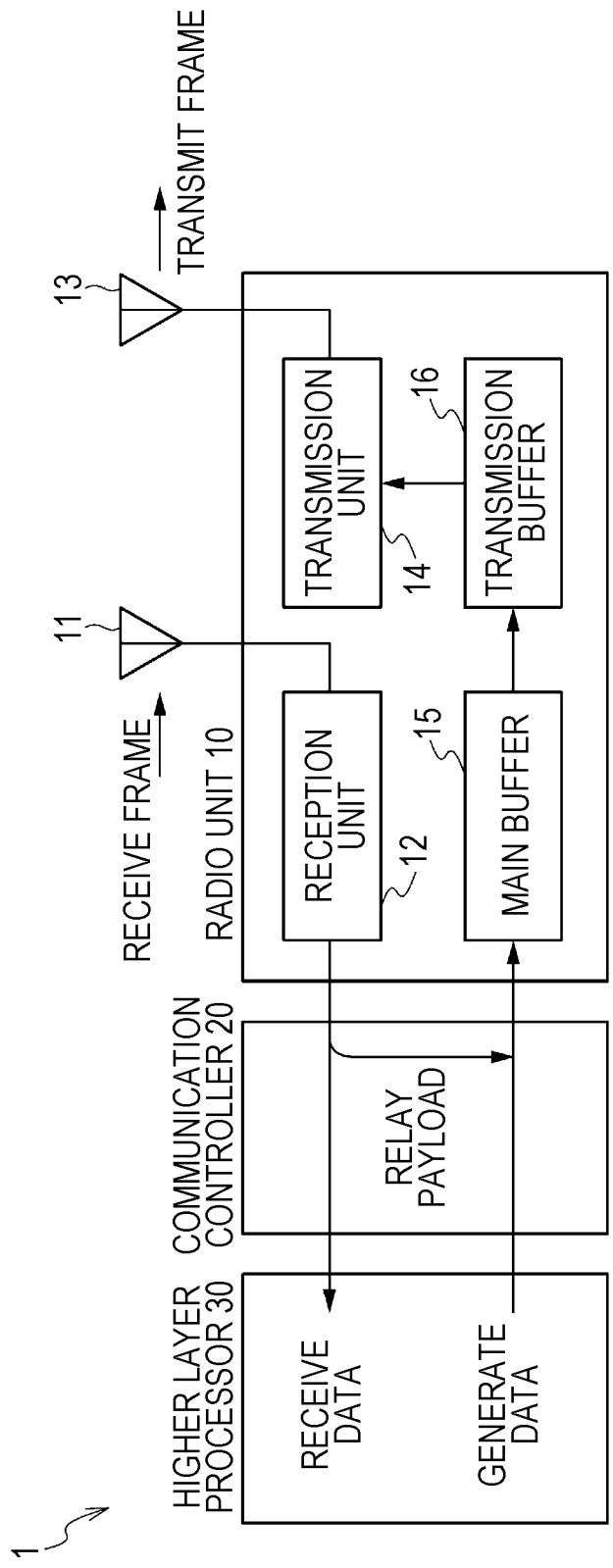
FIG. 5 is a diagram that illustrates the structure of a radio equipment disposed at each meter in the data transmitting/receiving method according to the second embodiment.

FIG. 5 is a diagram that illustrates the structure of a radio equipment disposed at each meter in the data transmitting/receiving method according to the embodiment.

A radio equipment 1 of the meter is configured to include a radio unit 10, a communication control unit 20, and a higher-level layer processing unit 30.

The radio unit 10 includes: a reception unit 12 that receives data through a reception antenna 11; a transmission unit 14 that transmits data through a transmission antenna 13; a main buffer 15 that buffers various kinds of data; and a transmission buffer 16 that is disposed between the main buffer 15 and the transmission unit 14 and buffers transmission data transmitted from the main buffer 15 to the transmission unit 14.

The communication control unit 20 is disposed between the radio unit 10 and the higher-level layer processing unit 30 and controls the overall radio communication that is performed by the radio unit 10. The communication control unit 20 extracts payloads included in data, which is transmitted from lower-level meters, received by the reception unit 12 through the reception antenna 11, determines a process to be performed for each payload, and transmits each payload to the main buffer 15 or the higher-level layer processing unit 30 based on a result of the determination. In addition, the communication control unit 20 determines whether or not each payload satisfies a transmission buffer condition to be described later.

The higher-level layer processing unit 30 performs various processes for the received data and generates various kinds of data relating to the transmission/reception of data such as a new payload.

Figure 6:
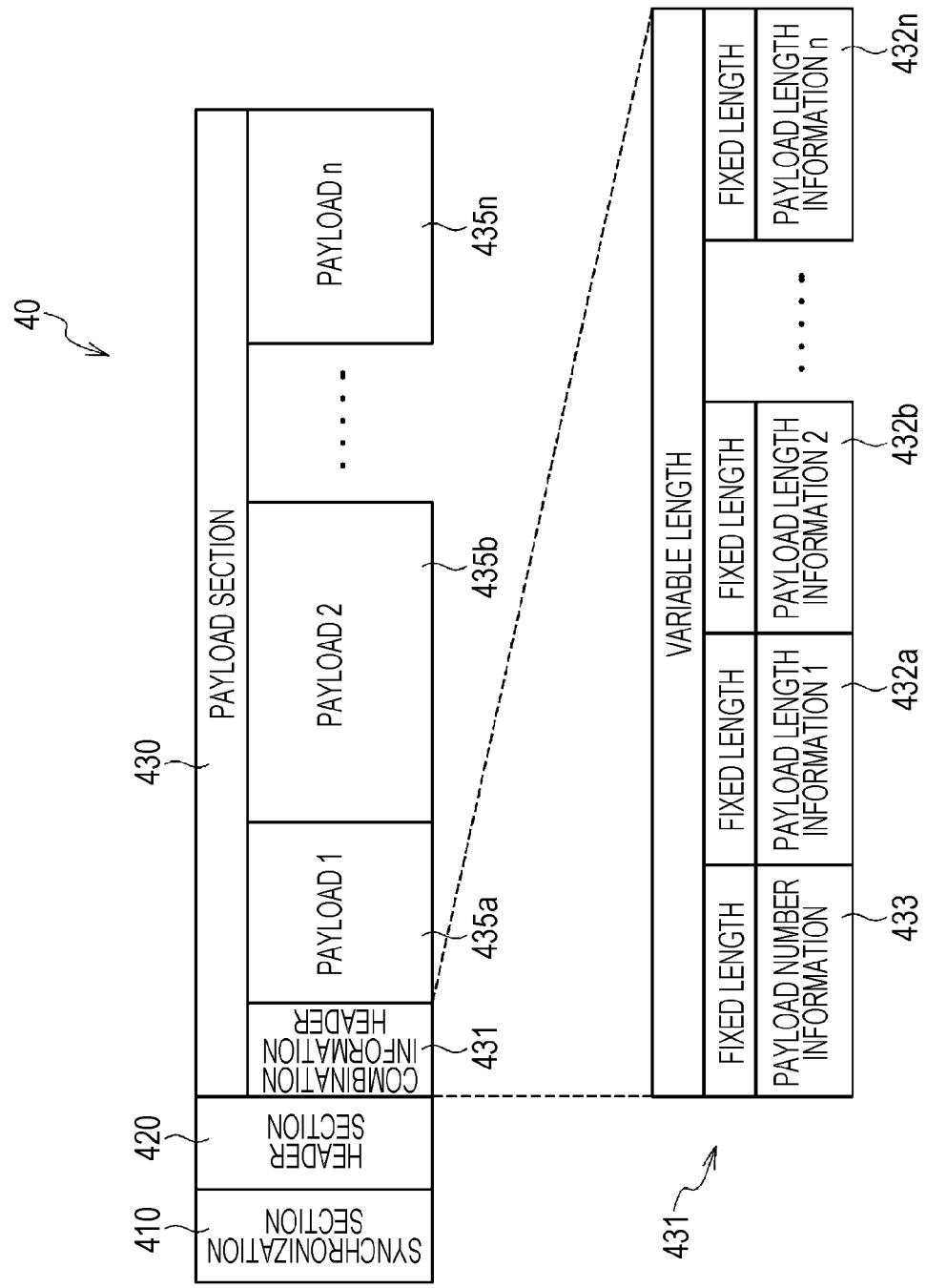
FIG. 6 is a diagram that illustrates the frame structure of data used in the data transmitting/receiving method according to the second embodiment.

Next, the frame structure of data used in the data transmitting/receiving method according to this embodiment will be described. FIG. 6 is a diagram that illustrates the frame structure of data used in the data transmitting/receiving method according to this embodiment.

In this embodiment, the data frame 40 is configured by combining a synchronization section 410, a header section 420, and a payload section 430 from the start thereof.

The synchronization section 410 is formed by using a known bit stream and is inserted into a transmission signal, and, by detecting this synchronization section on the reception side, frame synchronization is established.

The header section 420 represents control information such as a whole payload length that represents a length of the whole combined payloads.

The payload section 430 is configured by combining a combination information header 431 and one or a plurality of payloads 432a, 432b, . . . , 432n from the start thereof.

The combination information header 431 is configured by combining payload number information 433 that represents the number of payloads included in the payload section 430 and payload length information 432a, 432b, . . . , 432n respectively representing lengths of the payloads 435a, 435b, . . . , 435n. The payload number information 433 and the payload length information 432a, 432b, . . . , 432n respectively have fixed lengths. However, since the number of pieces of the payload length information 432a, 432b, . . . , 432n changes according to the number of payloads included in a data frame 40, the length of the whole combination information header 431 has a variable length.

While the combination information header 431 has a variable length according to the number of combined payloads in this way, the payload number information 433 that is a fixed-length field representing the number of the payloads is present in a leading part of the combination information header 431, all the elements are correctly read regardless of the number of combined payloads.

Figure 7:
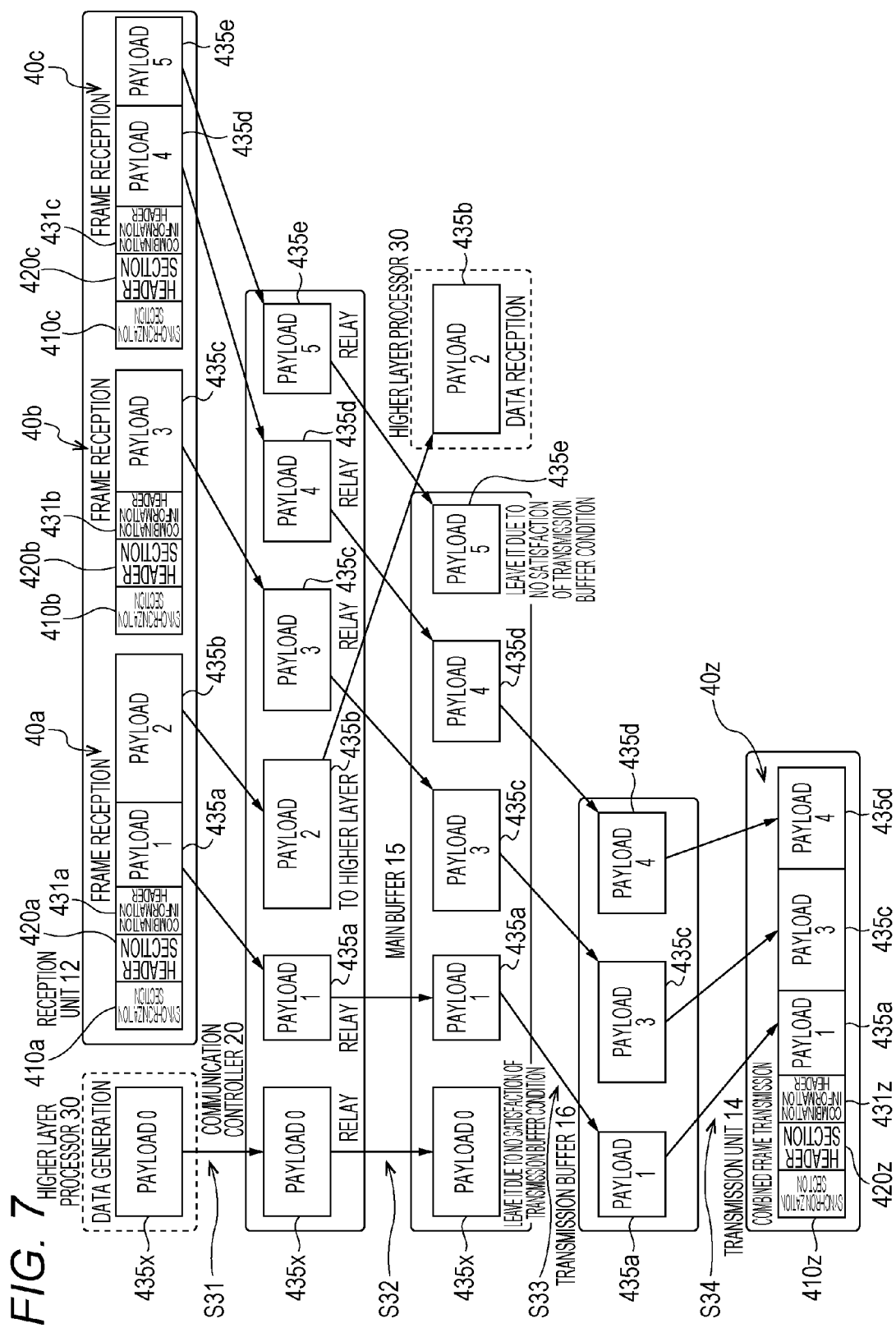
FIG. 7 is a schematic diagram that illustrates the appearance of a data combination in the data transmitting/receiving method according to the second embodiment.

Next, a data combination method using the above-described data frame 40 will be described with reference to FIG. 7. FIG. 7 is a schematic diagram that illustrates the appearance of a data combination in the data transmitting/receiving method according to this embodiment. In the data combination process illustrated in FIG. 7, not the collection meter CS, in other words, the PAN coordinator but a meter as an FFD relaying data in the lower level thereof is illustrated as an example. Here, the higher-level layer processing unit 30, the reception unit 12, the communication control unit 20, the main buffer 15, the transmission buffer 16, and the transmission unit 14 have the same configurations as those described with reference to FIG. 5, and thus, description thereof will not be presented here.

As illustrated in FIG. 7, first, the higher-level layer processing unit 30 generates data of a payload 435x based on data collected in the meter, and the reception unit 12 receives data frames 40a, 40b, and 40c from a lower-level meter through the reception antenna 11.

Here, the data frame 40a received by the reception unit 12, similar to the data frame according to this embodiment described with reference to FIG. 6, is configured by combining a synchronization section 410a, a header section 420a, a header combination section 431a, a payload 435a, and a payload 435b from the start thereof. Similarly, the data frame 41b is configured by combining a synchronization section 410b, a header section 420b, a header combination section 431b, and a payload 435c from the start thereof. In addition, the data frame 40c is configured by combining a synchronization section 410c, a header section 420c, a header combination section 431c, a payload 435d, and a payload 435e from the start thereof.

The payload 435x generated by the higher-level layer processing unit 30 of the meter in this way and the payloads 435a, 435b, 435c, 435d, and 435e included in the data frames 40a, 40b, and 40c received from the lower-level meter by the reception unit 12 are transmitted to the communication control unit 20 (step S31).

The communication control unit 20 determines a process to be performed for each of the payloads 435x, 435a, 435b, 435c, 435d, and 435e such as transmission to a further higher-level meter or a process to be performed by the meter and transmits the payloads to other components of the meter as is necessary. Here, data that is necessary for the determination is embedded in each payload.

In the example illustrated in FIG. 7, the communication control unit 20 relays all the payloads 435x, 435a, 435c, 435d, and 435e except the payload 435b to a higher-level meter and transmits the payload 435b to the higher-level layer processing unit 30 of the meter and determines that the payloads are provided for the processes performed therein.

Next, the communication control unit 20 transmits each payload to another component of the meter based on the result of the determination (step S32). Here, the communication control unit 20 transmits the payloads 435x, 435a, 435c, 435d, and 435e to the main buffer 15 so as to relay the payloads to a higher-level meter and transmits the payload 435b to the higher-level layer processing unit 30.

Next, the communication control unit 20 determines whether or not each of the payloads 435x, 435a, 435c, 435d, and 435e transmitted to the main buffer 15 satisfies the transmission buffer condition.

Here, the transmission buffer condition defines a condition to be satisfied for transmitting each payload to the transmission buffer 16 and transmitting the payload from the transmission unit 14 to a higher-level meter. As the transmission buffer conditions, more specifically, there are conditions such as whether or not a transmission destination of a payload transmitted first and a transmission destination of all the other payloads are the same, whether or not the number of payloads stored inside the transmission buffer 16 exceeds a predetermined upper limit, or whether or not a total volume of previous payloads stored inside the transmission buffer 16 exceeds a predetermined upper limit.

In the example illustrated in FIG. 7, as the result of the determination performed by the communication control unit 20, among the payloads transmitted to the main buffer 15, the payloads 435x and 435e are determined not to satisfy the transmission buffer condition and thus, are not transmitted to the transmission buffer 16 but are left as they are.

On the other hand, the payloads 435a, 435c, and 435d determined to satisfy the transmission buffer condition as the result of the determination performed by the communication control unit 20 are transmitted from the main buffer 15 to the transmission buffer 16 (step S33).

Next, the payloads 435a, 435c, and 435d transmitted to the transmission buffer are further transmitted to the transmission unit 14 and are combined with a synchronization section 410z, a header section 420z, and a combination information header 431z that are newly generated by the higher-level layer processing unit 30, whereby a new data frame 40z is generated (step S34). In this case, in the combination information header 431, the payload number information for the payloads 435a, 435c, and 435d and the payload length information of each thereof are included.

The data frame 40z that is newly generated in this way by the transmission unit 14 is transmitted to a higher-level meter through the transmission antenna 13 (see FIG. 5).

Figure 8:
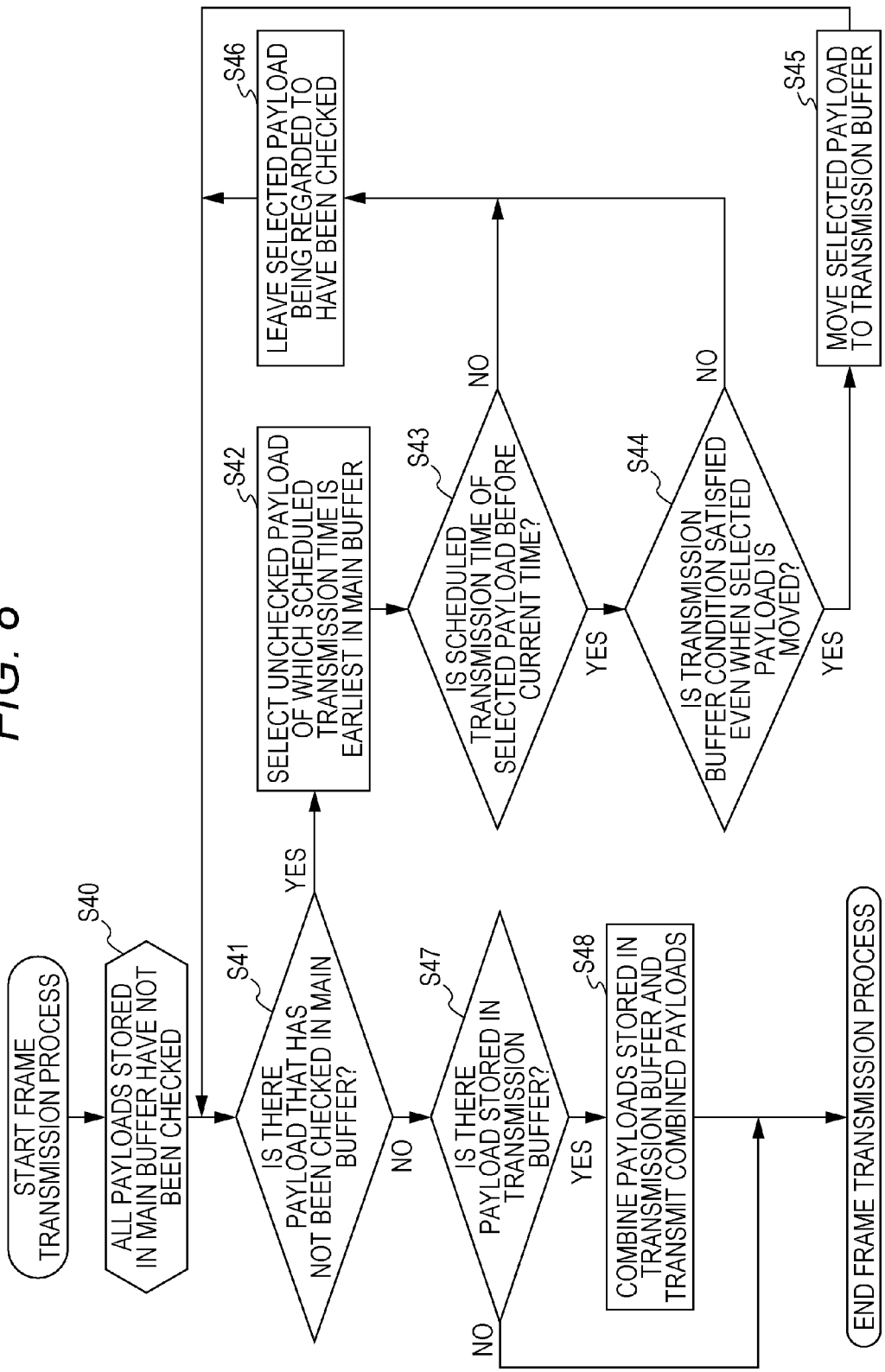
FIG. 8 is a flowchart that illustrates a frame transmission process in the data transmitting/receiving method according to the second embodiment.

Next, the data combination described with reference to FIG. 7 will be described in more detail with reference to FIG. 8. FIG. 8 is a flowchart that illustrates a frame transmission process in the data transmitting/receiving method according to this embodiment. When each payload is transmitted from the communication control unit 20 to the main buffer 15 (see step S33 illustrated in FIG. 7), the frame transmission process illustrated in FIG. 8 is started by the communication control unit 20.

The frame transmission process is started in a state in which scheduled transmission time according to the communication control unit 20 and the transmission buffer condition are not checked for all the payload data stores inside the main buffer 15 (step S40).

After the frame transmission process is started, the communication control unit 20 checks whether or not there is a payload, which has not been checked, present inside the main buffer 15 (step S41).

In a case where there are payloads, which have not been checked, inside the main buffer 15 (Yes in step S41), the communication control unit 20 selects ones of which the scheduled transmission time is earliest from among the not-checked payloads, present inside the main buffer 15 (step S42).

Next, the communication control unit 20 determines whether or not the scheduled transmission time of the payload selected in step S42 is before the current time (step S43).

In a case where the scheduled transmission time of the selected payload is before the current time (Yes in step S43), it is determined whether or not the selected payload satisfies the transmission buffer condition (step S44).

In a case where the selected payload satisfies the transmission buffer condition (Yes in step S44), the communication control unit 20 moves the selected payload from the main buffer 15 to the transmission buffer 16 (step S45), causes the process to be returned to step S41 again, and checks whether or not there is a payload which has not been checked inside the main buffer 15.

On the other hand, in a case where the scheduled transmission time of the selected payload is before the current time (No in step S43) and in a case where the selected payload does not satisfy the transmission buffer condition (No in step S44), the communication control unit 20 regards the selected payload to have been checked before leaving the selected payload (step S46).

The process is returned to step S41 described above, and, in a case where there is no payload, which has not been checked, inside the main buffer 15 (No in step S41), in other words, in a case where checking of all the payloads present inside the main buffer 15 has been completed, the communication control unit 20 checks whether or not there is a payload inside the transmission buffer 16 (step S47).

In a case where there is a payload inside the transmission buffer 16 (Yes in step S47), the payload present inside the transmission buffer 16 is transmitted to the transmission unit 14. The transmission unit 14 generates a new data frame by combining a synchronization section 410, a header section 420, and a combination information header 431, which are newly generated by the higher-level layer processing unit 30, with the payload and transmits the generated new data frame to a higher-level meter through the transmission antenna 13 (step S48), and a series of the frame transmission process ends. On the other hand, in a case where there is no payload inside the transmission buffer 14 (No in step S47), in other words, also in a case where there is no payload that has not been transmitted, the series of the frame transmission process ends.

According to the data transmitting/receiving method of the above-described second embodiment, for one or a plurality of slave devices or a plurality of payloads generated by the meter, the original synchronization section and the original header section are removed, and the plurality of payloads are combined with the synchronization section and the header section that are newly generated and are transmitted to a higher-level master device as a new data frame.

Accordingly, redundant sections such as a synchronization section and a header section can be reduced, and accordingly, a time required for the transmission/reception of data can be reduced. Then, by reducing the time required for the transmission/reception of data, the device transmitting/receiving data after the end of the CAP according to the first embodiment also can change to the sleep mode in a speedier manner, whereby the power consumption can be suppressed.

Third Embodiment

Next, a data transmitting/receiving method according to a third embodiment of the present invention will be described.

Figure 9:
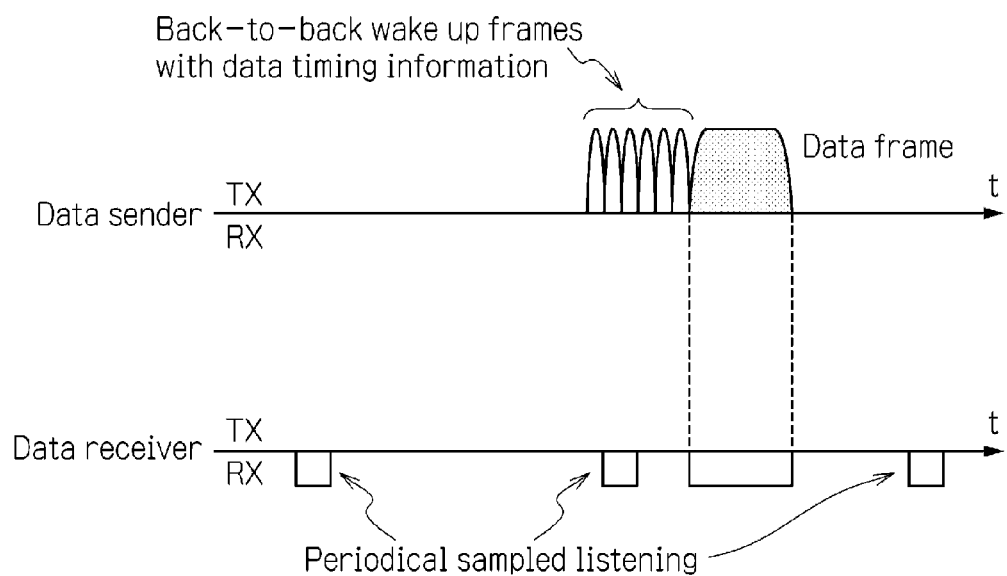
FIG. 9 is a diagram that illustrates a data transmitting/receiving method according to a third embodiment.

FIG. 9 is a diagram that illustrates the data transmitting/receiving method according to the third embodiment.

In this embodiment, each device repeats regular standby for a short time and is in the sleep mode at times other than that. In addition, a device that transmits data, before the transmission of a data frame, transmits a plurality of continuous synchronization signals (wakeup frame).

The wakeup frame includes synchronization information of a data frame transmitted thereafter, in other words, information relating to a time from the transmission of the wakeup frame to the transmission of a data frame, information designating a device disposed at a transmission destination, and the like.

While performing the above-described standby that is periodically repeated, a device that has received a wakeup frame transmitted from a device that is a data transmission source is returned from the sleep mode at the time of starting data transmission based on the synchronization information included in the wakeup frame and prepares for reception of a data frame. The data transmission/reception performed thereafter is similar to that of the first embodiment described above, and thus, description thereof will not be presented here.

On the other hand, a device that has not received a wakeup frame or a device that has received a wakeup frame but is not designated as a transmission destination is in the sleep mode during the transmission of the data frame.

According to the data transmitting/receiving method of this embodiment described above, each device is periodically operated and performs standby for a short time and changes to the sleep mode at times other than the standby time. Accordingly, waste of the power is effectively suppressed, and power saving can be achieved.

In addition, it is not necessary to periodically transmit the beacon signal unlike the conventional data transmitting/receiving method, and only a wakeup frame may be transmitted as is necessary. Accordingly, waste of the power is effectively suppressed, and further power saving can be achieved.

In addition, since the CAP can be shortened more than that of the conventional data transmitting/receiving method, the active period is shortened, and the inactive period, in other words, a period during which the device is in the sleep mode can be increased as that much. Accordingly, the operating time of the device can be shortened, whereby the power consumption of the device can be effectively suppressed.

Also in the data transmitting/receiving method according to this embodiment, as is performed in the data transmitting/receiving method according to the second embodiment, for payloads received from one or a plurality of slave devices or a plurality of payloads generated by the meter, it may be configured such that the original synchronization section and the original header section are removed from the data frame, and the plurality of payloads are combined with the synchronization section and the header section that are newly generated and are transmitted to a higher-level master device as a new data frame.

Accordingly, redundant sections such as a synchronization section and a header section can be reduced, and accordingly, a time required for the transmission/reception of data can be reduced. Then, by reducing the time required for the transmission/reception of data, the device transmitting/receiving data after the end of the CAP according to the first embodiment also can change to the sleep mode in a speedier manner, whereby the power consumption can be suppressed.

Fourth Embodiment

Next, a data transmitting/receiving method according to a fourth embodiment of the present invention will be described.

Figure 10:
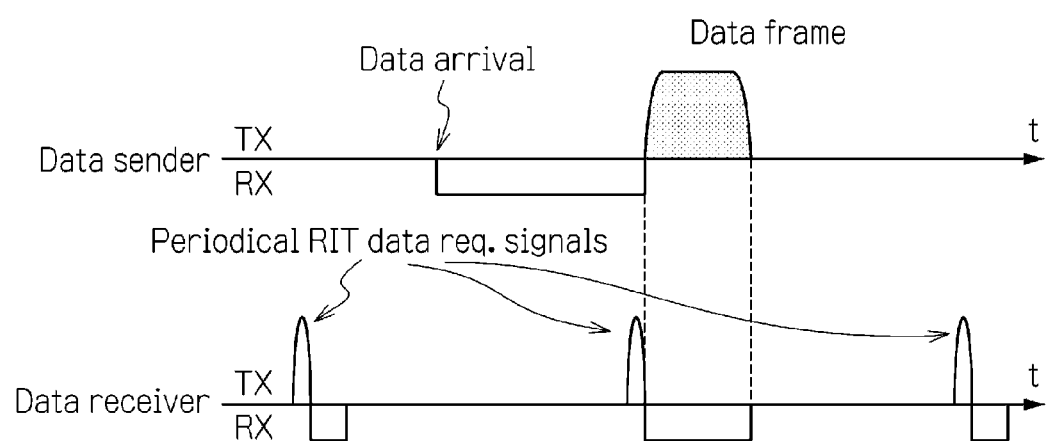
FIG. 10 is a diagram that illustrates a data transmitting/receiving method according to a fourth embodiment.

FIG. 10 is a diagram that illustrates the data transmitting/receiving method according to the fourth embodiment.

In the data transmitting/receiving method according to this embodiment, as illustrated in FIG. 10, each of all the devices transmits a synchronization signal (RIT data request command) that represents a time slot in which data reception is periodically performed and performs standby for a short time following the transmission of the synchronization signal.

Then, a device that transmits data recognizes a time slot in which reception of data is performed based on the synchronization signal of a device that is a transmission destination of the data and starts the transmission of the data in the time slot.

The operations of the devices on the transmission side and the reception side after the start of the transmission/reception of data are similar to those of the first embodiment described above, and thus, description thereof will not be presented here.

According to the data transmitting/receiving method of this embodiment described above, transmission/reception is started immediately after the transmission of the RIT, and accordingly, there is no time loss until the start of transmission/reception. In addition, similar to the first embodiment, the CAP can be shortened more than that of the conventional data transmitting/receiving method.

For this reason, the active period is shortened, and the inactive period, in other words, a period during which the device is in the sleep mode can be increased as that much. Accordingly, the operating time of the device can be shortened, whereby the power consumption of the device can be effectively suppressed.

In addition, since the CAP can be shortened more than that of the conventional data transmitting/receiving method, the active period is shortened, and the inactive period, in other words, a period during which the device is in the sleep mode can be increased that much. Accordingly, the operating time of the device can be shortened, whereby the power consumption of the device can be effectively suppressed.

Also in the data transmitting/receiving method according to this embodiment, as is performed in the data transmitting/receiving method according to the second embodiment, for payloads received from one or a plurality of slave devices or a plurality of payloads generated by the meter, it may be configured such that the original synchronization section and the original header section are removed from the data frame, and the plurality of payloads are combined with the synchronization section and the header section that are newly generated and are transmitted to a higher-level master device as a new data frame.

Accordingly, redundant sections such as a synchronization section and a header section can be reduced, and accordingly, a time required for the transmission/reception of data can be reduced. Then, by reducing the time required for the transmission/reception of data, the device transmitting/receiving data after the end of the CAP according to the first embodiment also can change to the sleep mode in a speedier manner, whereby the power consumption can be suppressed.

REFERENCE SIGNS LIST

1 Radio equipment
10 Radio unit

11 Reception antenna
12 Reception unit
13 Transmission antenna
14 Transmission unit
15 Main buffer
16 Transmission buffer
20 Communication control unit
30 Higher-level layer processing unit
40 Data frame
410 Synchronization section
420 Header section
430 Payload section
431 Combination information header
432 Payload length information
433 Payload number information
435 Payload
FIG. 5
30 HIGHER LAYER PROCESSOR
RECEIVE DATA
GENERATE DATA
20 COMMUNICATION CONTROLLER
RELAY PAYLOAD
RECEIVE FRAME
TRANSMIT FRAME
10 RADIO UNIT
12 RECEPTION UNIT
14 TRANSMISSION UNIT
15 MAIN BUFFER
16 TRANSMISSION BUFFER
FIG. 6
410 SYNCHRONIZATION SECTION
420 HEADER SECTION
430 PAYLOAD SECTION
431 COMBINATION INFORMATION HEADER
435a PAYLOAD 1
435b PAYLOAD 2
435n PAYLOAD n
VARIABLE LENGTH
FIXED LENGTH
433 PAYLOAD NUMBER INFORMATION
432a PAYLOAD LENGTH INFORMATION 1
432b PAYLOAD LENGTH INFORMATION 2
432n PAYLOAD LENGTH INFORMATION n
FIG. 7
30 HIGHER LAYER PROCESSOR
DATA GENERATION
435x PAYLOAD 0
12 RECEPTION UNIT
FRAME RECEPTION
410a SYNCHRONIZATION SECTION
420a HEADER SECTION
431a COMBINATION INFORMATION HEADER
435a PAYLOAD 1
435b PAYLOAD 2
410b SYNCHRONIZATION SECTION
420b HEADER SECTION
431b COMBINATION INFORMATION HEADER
435c PAYLOAD 3
410c SYNCHRONIZATION SECTION
420c HEADER SECTION
431c COMBINATION INFORMATION HEADER
435d PAYLOAD 4
435e PAYLOAD 5
20 COMMUNICATION CONTROLLER
435x PAYLOAD 0
RELAY
435a PAYLOAD 1
435b PAYLOAD 2
TO HIGHER LAYER
435c PAYLOAD 3
435d PAYLOAD 4
435e PAYLOAD 5
15 MAIN BUFFER
435x PAYLOAD 0
LEAVE IT DUE TO NO SATISFACTION OF TRANSMISSION BUFFER CONDITION
435a PAYLOAD 1
435c PAYLOAD 3
435d PAYLOAD 4
435e PAYLOAD 5
30 HIGHER LAYER PROCESSOR
435b PAYLOAD 2
DATA RECEPTION
16 TRANSMISSION BUFFER
435a PAYLOAD 1
435c PAYLOAD 3
435d PAYLOAD 4
14 TRANSMISSION UNIT
COMBINED FRAME TRANSMISSION
410z SYNCHRONIZATION SECTION
420z HEADER SECTION
431z COMBINATION INFORMATION HEADER
435a PAYLOAD 1
435c PAYLOAD 3
435d PAYLOAD 4
FIG. 8
START FRAME TRANSMISSION PROCESS
S40 ALL PAYLOADS STORED IN MAIN BUFFER HAVE NOT BEEN CHECKED
S41 IS THERE PAYLOAD THAT HAS NOT BEEN CHECKED IN MAIN BUFFER?
S42 SELECT UNCHECKED PAYLOAD OF WHICH SCHEDULED TRANSMISSION TIME IS EARLIEST IN MAIN BUFFER
S43 IS SCHEDULED TRANSMISSION TIME OF SELECTED PAYLOAD BEFORE CURRENT TIME?
S44 IS TRANSMISSION BUFFER CONDITION SATISFIED EVEN WHEN SELECTED PAYLOAD IS MOVED?
S45 MOVE SELECTED PAYLOAD TO TRANSMISSION BUFFER
S46 LEAVE SELECTED PAYLOAD BEING REGARDED TO HAVE BEEN CHECKED
S47 IS THERE PAYLOAD STORED IN TRANSMISSION BUFFER?
S48 COMBINE PAYLOADS STORED IN TRANSMISSION BUFFER AND TRANSMIT COMBINED PAYLOADS
END FRAME TRANSMISSION PROCESS

The invention claimed is:

1. A data transmitting/receiving method performed between a master device and at least one slave device, wherein a data frame transmitted/received between the master device and the slave device is configured to include a synchronization section that defines a signal used for synchronization, a payload section that includes at least one payload, a combined information header defining a number of payloads and a payload length of each of the payloads, and a header section that defines a payload length of the payload section as a whole, the data transmitting/receiving method comprising:

synchronization establishing step for establishing synchronization between the master device and the slave device based on predetermined synchronization information;

receiving step for receiving the data frame after the establishment of the synchronization;

payload extracting step for extracting the payloads from the received data frame;

payload generating step for generating a new payload section by combining the extracted payloads with another payload extracted from another data frame received from another device or with a new payload generated by a device that receives the data frame;

header generating step for generating a new synchronization section and a new header section;

data frame generating step for generating a new data frame by combining the new synchronization section and the new header section that are generated with the new payload section; and transmitting step for transmitting the generated new data frame, wherein the slave device determines the master device to be connected based on a predetermined criterion which includes at least one of a distance UP to a collection meter, a distance from a device that has transmitted a scan request, and an order in which scan responses are transmitted.

2. The data transmitting/receiving method according to claim 1, wherein, in the synchronization establishing step, the device that receives the data frame periodically repeats standby for a short time, and a device that transmits the data frame continuously transmits a first synchronization signal representing transmission timing of the data frame as the predetermined synchronization information before the transmission of the data frame.

3. The data transmitting/receiving method according to claim 2, further comprising:
contention access period (CAP) setting step for setting a CAP during which the data frame is transmitted/received between the master device and the slave device based on the established synchronization; and
extending step for extending the transmission/reception of the data frame even after the CAP in a case where the transmission/reception of the data frame is not completed within the CAP.

4. The data transmitting/receiving method according to claim 1, wherein, in the synchronization establishing step, all devices periodically transmit a second synchronization signal representing reception timing of the data frame as the predetermined synchronization information, and a device transmitting the data frame receives the second synchronization signal from the device receiving the data frame.

5. The data transmitting/receiving method according to claim 4, further comprising:
contention access period (CAP) setting step for setting a CAP during which the data frame is transmitted/received between the master device and the slave device based on the established synchronization; and
extending step for extending the transmission/reception of the data frame even after the CAP in a case where the transmission/reception of the data frame is not completed within the CAP.

6. The data transmitting/receiving method according to claim 1, wherein, in the synchronization establishing step, the predetermined synchronization information is a beacon signal transmitted from the master device, the data transmitting/receiving method further comprising frequency lowering step for lowering a transmission frequency of the beacon signal from the master device in a state in which the synchronization is maintained.

7. The data transmitting/receiving method according to claim 6, further comprising:
contention access period (CAP) setting step for setting a CAP during which the data frame is transmitted/received between the master device and the slave device based on the established synchronization; and
extending step for extending the transmission/reception of the data frame even after the CAP in a case where the transmission/reception of the data frame is not completed within the CAP.

8. The data transmitting/receiving method according to claim 1, further comprising:
contention access period (CAP) setting step for setting a CAP during which the data frame is transmitted/received between the master device and the slave device based on the established synchronization; and
extending step for extending the transmission/reception of the data frame even after the CAP in a case where the transmission/reception of the data frame is not completed within the CAP.

* * * * *